Feb. 18, 1969
F. B. AIRHEART
3,427,827
SHOCK JOINT
Filed Oct. 21, 1966
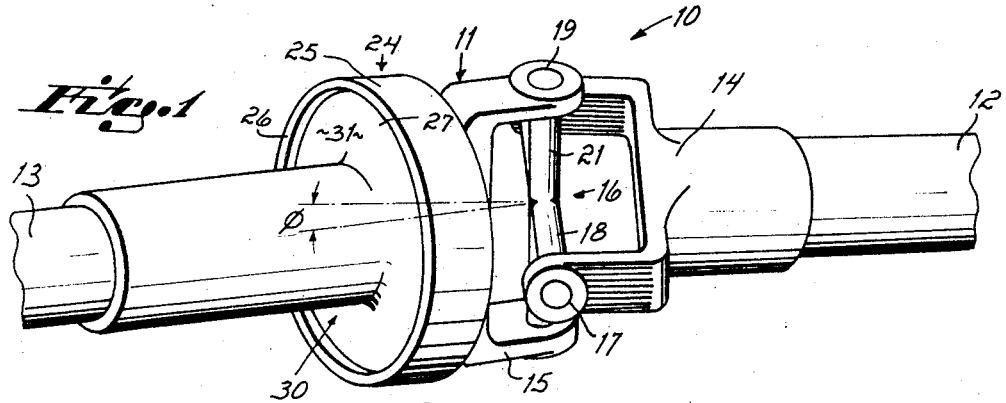
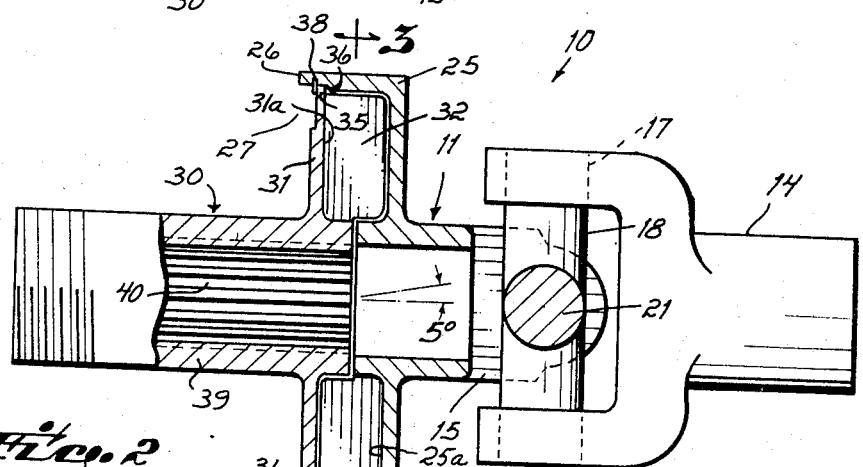
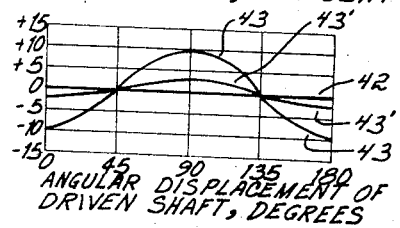
VARIATION OF ANGULAR VELOCITY
OF DRIVEN SHAFT, PER CENT
ANGULAR DISPLACEMENT OF
DRIVEN SHAFT, DEGREES
Fig. 4
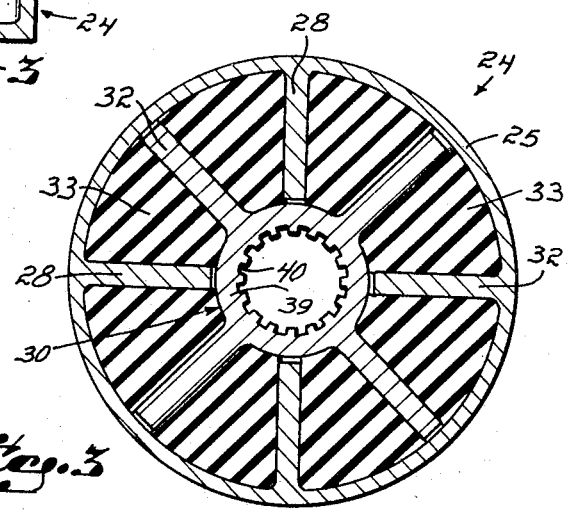
INVENTOR.
Franklin B. Airheart
BY
Wood, Herron & Evans
ATTORNEYS

United States Patent Office 3,427,827
Patented Feb. 18, 1969

3,427,827
SHOCK JOINT
Franklin B. Airheart, Granada Hills, Calif., assignor to Airheart Products Inc., Van Nuys, Calif., a corporation of California
Filed Oct. 21, 1966, Ser. No. 588,375
U.S. Cl. 64—14
Int. Cl. F16d *3/68, 3/14*
2 Claims

ABSTRACT OF THE DISCLOSURE

A shock joint having a first plate coupled to one yoke of a universal joint, a second plate mounted with respect to the first plate so as to permit angulation between the axes of the plates, overlapping blades transversely projecting from each said plate, and an elastomer located between the two plates and forming a driving connection between said plates through said overlapping blades.

---

This invention relates to a coupling associated with a universal joint and more particularly the invention is directed to a shock absorbing coupling for use in conjunction with the universal joint in an automotive drive shaft.

The invention is particularly useful in association with an automotive drive shaft for the drive shaft is subjected to stresses and shocks which create undesirable vibrations and shorten the life of the drive components.

The stresses on the drive shaft are incurred in part by the constant acceleration and deceleration of the automobile. A more constant and subtle stress is that which is derived from the universal joint forming a part of the drive shaft. When the axes of the shafts on either side of the universal joint are not precisely coincident, that is to say, there is an angle between the axes of the shafts, the instantaneous angular velocity of the driven shaft will vary from the instantaneous angular velocity of the driving shaft. If the driving shaft is rotating at a constant angular velocity, for example, the speed of the driven shaft increases and decreases four times for each revolution of the shaft. Thus, the shaft and particularly the universal joints are constantly being fatigued during the operation of the automobile even though it is moving at a fairly constant speed.

Further, it appears that, in an angulated universal joint, the driving yoke tends to urge the driven yoke laterally during each revolution. These repeated lateral forces constantly fatigue and work harden (Brinell) the teeth of the spline connection normally used in an automotive drive shaft. The precise nature of these forces and the manner in which they are developed are not completely understood. However, it is recognized that it is common for the spline connection of a drive shaft to be subject to recurring failure.

An objective of the present invention has been to provide a shock absorbing coupling in the drive shaft, preferably immediately adjacent one of the universal joint yokes. The coupling, in accordance with the invention, has driving and driven elements interconnected by an elastomer, the elements being dimensioned with respect to each other to permit the axes of the elements to vary angularly from exact coincidence and to permit variation in the rotational angle of one element with respect to the other. By permitting angulation, through an elastomeric connection, the undesirable lateral forces are absorbed substantially entirely in the elastomer, rather than being transmitted to the metallic driving components.

An important feature of the invention resides in the provision of a coupling which is quite thin in its axial dimension as compared to its radial dimension. This dimensional relationship is contrasted to prior art elastomeric couplings wherein the coupling has a long axial dimension compared to its radial dimension. In the present invention, the large radius of the coupling provides a large torque arm for the transmission of forces to the elastomer. Hence, the force or load applied to the elastomer is decreased as compared to elongated prior art couplings.

Further, a large ratio of radius to thickness allows the driving and driven elements to have a sufficient clearance between them to permit them to angulate with respect to each other and thereby to absorb the lateral forces referred to above.

The coupling of the present invention thus absorbs the shocks of acceleration and deceleration in the elastomer, it absorbs the stress of varying instantaneous velocities of the driving and driven elements, and it absorbs, omnidirectionally, the angular movement of the drive shaft components.

The coupling of the present invention provides the following advantages:
 (1) Reduction of the shock to the drive train.
 (2) Positive alignment of the universal joint yoke to its spider.
 (3) Permitting shafts on either side of universal joints to approach identical instantaneous velocity.
 (4) Elimination of a tendency of spline elements of drive shaft to Brinell or work harden, thereby giving the elements a longer life.
 (5) Dampening noise and vibration in drive train.
 (6) Permitting positive manual engagement of the coupling elements to prevent slipping if the elastomer is destroyed.

The objectives and advantages of the present invention will be more readily understood from the following detailed description taken in conjunction with the accompanying drawings in which:
 FIG. 1 is a perspective view of the invention connected to a universal joint,
 FIG. 2 is a cross sectional view, partly in elevation, of the invention,
 FIG. 3 is a cross sectional view taken along lines 3—3 of FIG. 2, and
 FIG. 4 is a curve of the velocity of the respective universal joint shafts illustrating an advantage of the invention.

Referring to the drawings, the assembly includes a universal joint 10 and a coupling 11 which interconnects a driving shaft 12 and a driven shaft 13. The universal joint includes a driving yoke 14 and a driven yoke 15 which are interconnected by a spider 16. The spider 16 is pivoted at 17 to the driving yoke 14 by an arm 18 and is pivoted to the driven yoke at 19 by an arm 21. The universal joint thus far described is conventional.

The coupling 11 of the present invention has a first coupling element 24 which includes a cup 25 which is integral with the driven yoke 15. It should be understood that the coupling 11 could be applied to the driving yoke instead of the driven yoke without departing from the spirit or scope of the invention. The cup includes a flange 26 which projects axially away from the yoke 15 and presents an open end 27. Four blades 28 project radially inwardly from the flange 26 as well as axially from a transverse surface 25a formed by the bottom of cup 25 and are formed integrally with the cup structure.

A second coupling element 30 includes a plate 31 which is located adjacent the open end of the cup 25 and has four blades 32 which project axially from a transverse surface 31a into the cup 25, the blades 32 being positioned between the cup blades 28. An elastomeric material 33 such as rubber is disposed in the voids between adjacent blades 28 and 32. The elastomer may be preformed as wedges which are inserted into the coupling at the time of its assembly or alternatively, the rubber may be poured into the cup between the blades and vulcanized into position. As another alternative, the elastomer could be a preformed doughnut having slots into which the blades fit.

The plate 31 has an annular flange 35 which is located between an annular shoulder 36 formed on the internal surface of the flange 26 and a snap ring 37 fitted into a groove 38 in the flange 26. The snap ring 37 secures the two coupling elements together.

The coupling elements 30 also include a sleeve 39 which is integral with the plate 31 and is splined as at 40 to receive the driven shaft 13.

It should be noted that the thickness of the annular flange 35 is substantially smaller than the distance between the shoulder 36 and the snap ring 37 between which the flange is located. It should also be noted that the external dimensions of the blades 32 and the plate 31 are substantially smaller than the internal dimensions of the cup 25 so that there is a slop fit between the two elements. It should also be noted that the radial dimension of the coupling is substantially greater than its axial dimension. In the preferred form of the invention, these dimensions are such that the radial dimension of each blade is approximately twice the axial dimension of each blade. The ratio of the radial to axial dimensions could be 1:1 but the 2:1 ratio is preferred. The slop fit and the radial to axial dimension ratio permit the axis of the driving element to vary from the axis of the driven element by at least 5°. By way of example and without imparting any limitation on the invention, in a coupling whose cup 25 has a diameter of approximately five inches, a radial clearance of ⅛ inch at the extremity of the blades 32 and appropriate clearances elsewhere as shown permit the desired angulation of the two coupling elements.

The operation of the invention can be best understood by reference to FIGS. 1 and 4. As shown in FIG. 1, the axes of the driving and driven shafts 12 and 13 are out of coincidence by an angle $\phi$. As the shaft 12 rotates at a constant angular velocity, indicated at 42 on the curve of FIG. 4, the driven shaft 13 normally rotates at a variable angular velocity as indicated by the curve 43 in FIG. 4. The instantaneous angular velocity of the driven shaft is the same as that of the driving shaft at only four positions in one revolution of the shafts. This means that the speed of the driven shaft is constantly increasing and decreasing during each revolution, these variations giving rise to undesirable vibration as well as fatiguing the materials of the universal joint, driving shaft, spline coupling, and associated mechanisms. By interposing the shock coupling of the present invention between one of the yokes and its associated shaft, the variations in the angular velocities as well as angular alignments are absorbed to a large extent in the elastomer whereby the variation curve of the driven shaft is leveled out as indicated at 43' in FIG. 4. Additionally, the stress of the lateral forces is absorbed, thereby increasing the life of the drive shaft components.

I claim:
1. A transmission coupling for a universal joint having two yokes interconnected by a spider, comprising
   a cup fixed to one yoke and having a flange projecting generally axially away from said yoke presenting an open end,
   a plurality of radially inwardly projecting blades integral with said flange,
   a plate located adjacent said open end of said cup and having a plurality of blades projecting into said cup and positioned between and spaced from said cup blades, said plate including means for connecting the plate to a shaft,
   the ratio of the radial dimension to the axial dimension of each blade being approximately in the range of 1:1 to 2:1,
   said plate and cup elements being dimensioned to permit at least approximately 5° variation from coincidence of their respective axes,
   an elastomeric material substantially filling the space between said blades.
2. A transmission coupling for a universal joint having two yokes interconnected by a spider comprising,
   a driving element having an axis about which it rotates,
   a driven element having an axis about which it rotates,
   one of said elements being connected to one yoke of said universal joint,
   said elements presenting respectively two transverse surfaces facing each other,
   said elements having overlapping drive blades fixed to and projecting axially from said surfaces, the ratio of the radial dimension to the axial dimension of each blade being approximately in the range of 1:1 to 2:1,
   an elastomeric material filling the space between said blades,
   and said driving and driven elements having a clearance between them sufficient to permit approximately 10° angulation between their respective axes.

References Cited

UNITED STATES PATENTS

| 565,935 | 8/1896 | Sperry | 64—14 |
| 1,548,629 | 8/1925 | Pfander | 64—14 |
| 1,868,163 | 7/1932 | Evans | 64—14 |
| 2,849,871 | 9/1958 | Moeller | 64—14 |
| 3,195,324 | 7/1965 | Sellwood et al. | 64—14 |

FOREIGN PATENTS 958,577  5/1964  Great Britain.

HALL C. COE, Primary Examiner.

U.S. Cl. X.R.

64—27